June 29, 1943.  W. T. STEARN  2,322,893
REGISTERING DEVICE
Filed Oct. 4, 1940  3 Sheets-Sheet 1
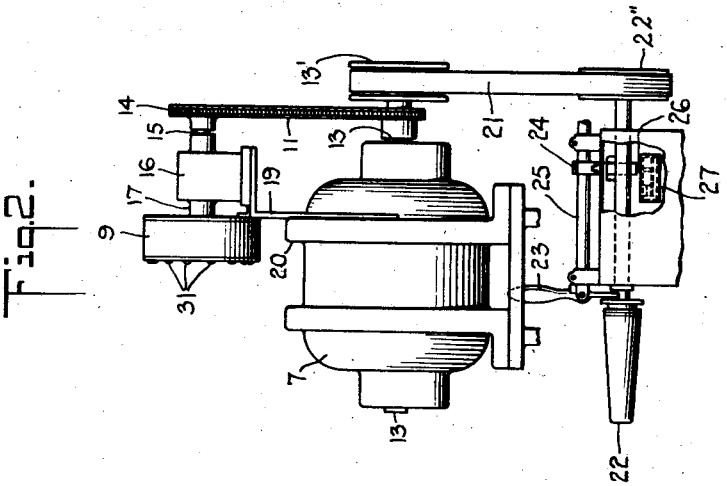
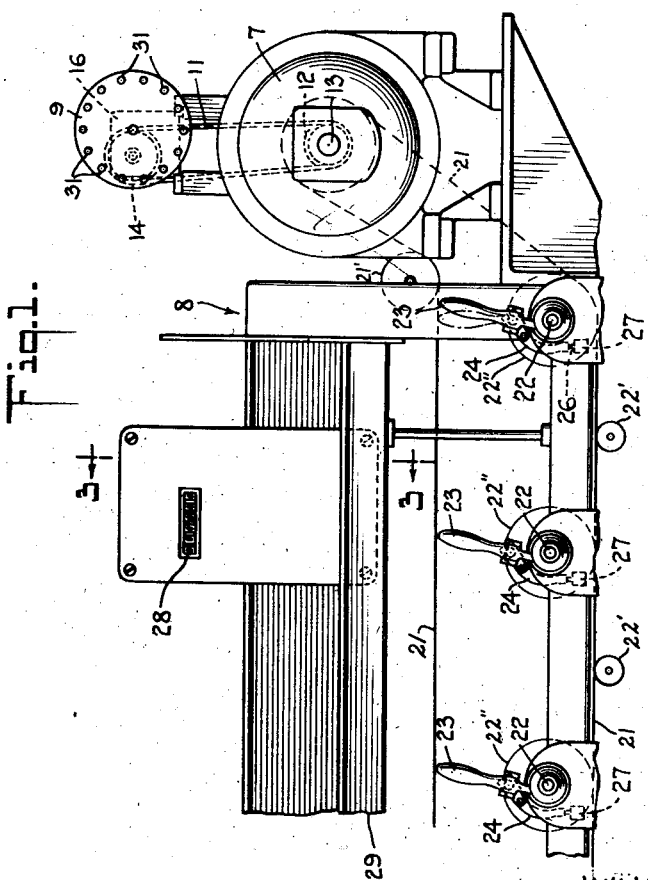
INVENTOR
WILLIAM T. STEARN
BY
ATTORNEYS June 29, 1943. W. T. STEARN 2,322,893
REGISTERING DEVICE
Filed Oct. 4, 1940 3 Sheets-Sheet 2
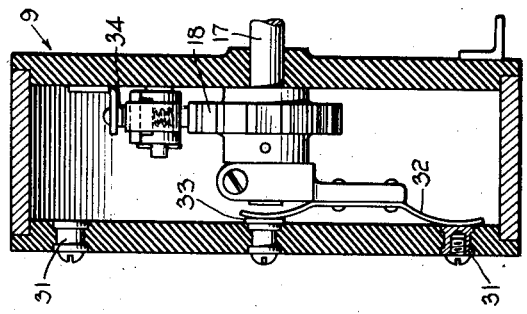
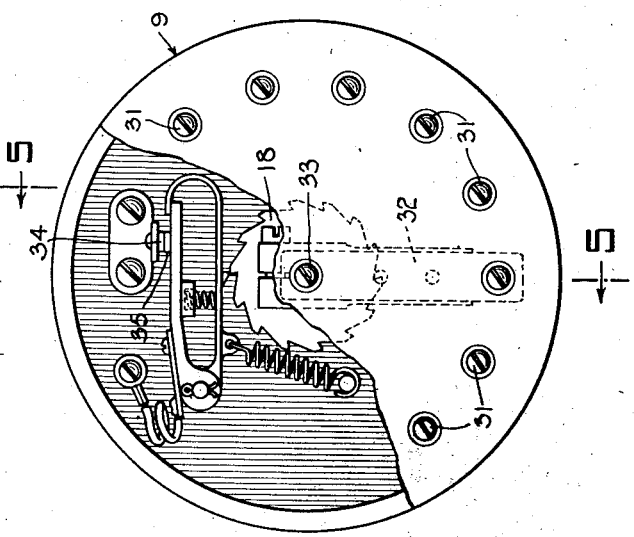
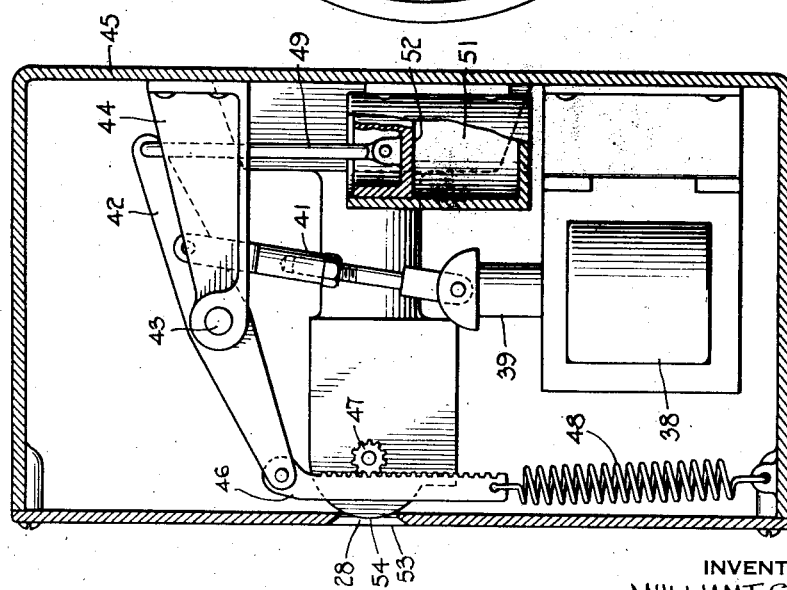
INVENTOR
WILLIAM T. STEARN
BY
ATTORNEYS

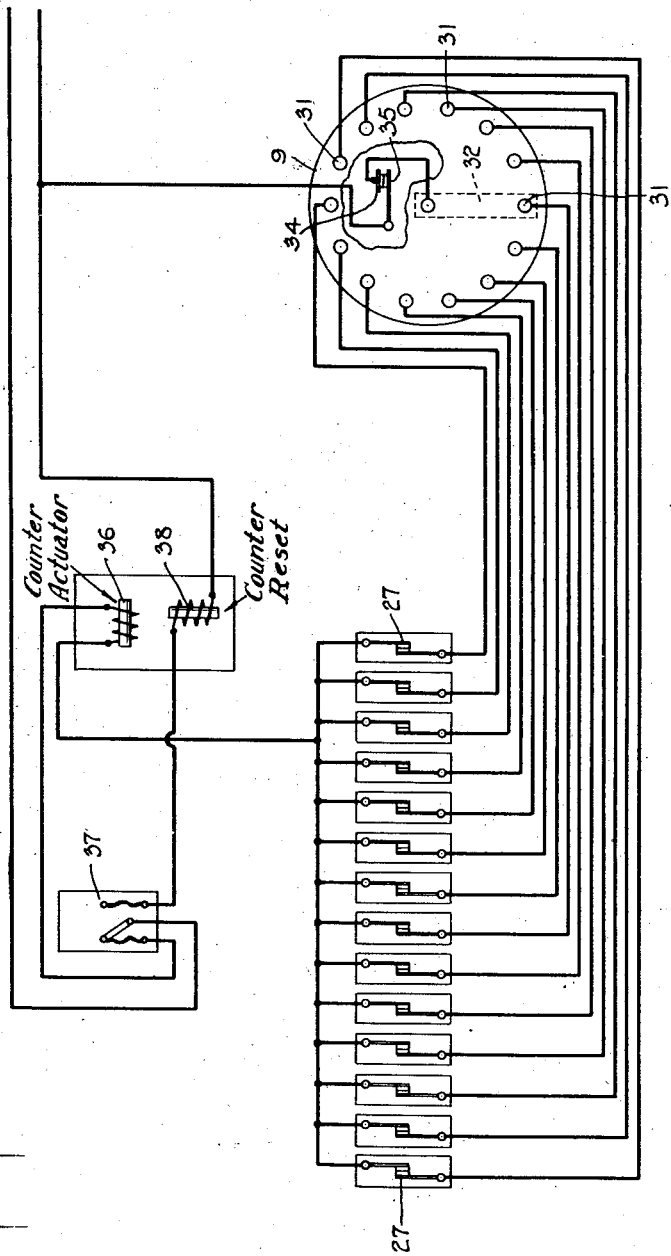

Patented June 29, 1943

2,322,893

UNITED STATES PATENT OFFICE 2,322,893

REGISTERING DEVICE

William T. Stearn, Cumberland, Md., assignor to Celanese Corporation of America, a corporation of Delaware Application October 4, 1940, Serial No. 359,743

4 Claims. (Cl. 235—92)

This invention relates to a registering device, and relates more particularly to a production meter for positively and accurately checking the output of a winding machine, e. g. a cone winding machine.

One method of production checking of winding machines heretofore used consisted of weighing the production of one yarn package per operator and making the determinations of the machine and operator efficiencies on the actual quantity produced. While this method represented a substantially good approach to the problem, some inaccuracies and inequalities creep in.

Another method frequently employed to determine machine and operator efficiencies is to check the winding machine at definite and frequent periods, say, each hour, during the day, at each period the number of operating and idling spindles being noted. This method provided an accurate coverage of all spindles a few minutes each hour. Except at these checks and during the policing of the machine by the checker many spindles may be idle. Therefore such a method is clearly not satisfactory.

It is an important object of this invention to provide a means for accurately checking the machine and operator production and efficiency whereby the personal element is substantially eliminated and positive and complete coverage is attained.

Another object of this invention is the provision of an automatic spindle checker or registering device which positively checks on each spindle approximately once each minute and registers a unit on a counter for each spindle operating.

Other objects of this invention, together with certain details of construction and combinations of parts, will appear from the following detailed description.

According to my invention, an automatic spindle checker operated by the winding machine positively checks on each spindle approximately once each minute and registers on a counter a unit for each spindle operating. Thus, the registration of the counter will be an accumulated and accurate sum total of the spindle minutes, during which the winding machine operated, in arbitrary units whose parts are indications of the speed or number of revolutions of the individual spindles, since the control drive for the checking or registering device is the motor of the winding machine which, from machine to machine, is normally uniform.

The device of my invention may be employed on any type of winding machine, an example of which is the No. 50 "Leesona" winder manufactured by the Universal Winding Company of Boston, Mass.

A form of checking or registering device according to my invention will now be described in detail with reference to the accompanying drawings, wherein Fig. 1 is a front elevational view of a portion of a cone winding machine showing the checking or registering device and counter with relation to the coning machine, Fig. 2 is a side elevational view of a portion of the coning machine showing the relative position of the counter device, Fig. 3 is a cross-sectional view, taken on line 3—3, in Fig. 1 showing the resetting mechanism of the counter, Fig. 4 is a detailed view of the rotary switch assembly shown in Figs. 1 and 2 as mounted above the motor, Fig. 5 is a cross-sectional view of the rotary switch assembly, taken on line 5—5 in Fig. 4, and Fig. 6 is a diagrammatic view of the electrical hookup.

Like characters and reference indicate like parts throughout the several views of the drawings.

Referring now to Figs. 1 and 2 of the drawings, the driving motor 7 of the coning machine, generally indicated by reference numeral 8, is utilized as the driving source for the rotary switch assembly 9 hereinafter more fully described. The motor 7 drives a rotary switch assembly 9 by means of a sprocket chain 11 connecting a sprocket 12 on a shaft 13 of the motor and a sprocket 14 on the input shaft 15 of a small gear reducer 16, the output shaft 17 of which rotates the cam 18 of the switch assembly. The ratio of the drive from the motor shaft 13 to the rotary switch assembly is preferably such that each spindle on the winding machine is checked approximately once each minute. The switch assembly and the speed reducer are carried on a shelf 19 fixed to a flange 20 of the motor 7. The shaft 13 also carries a pulley 13' which is adapted to drive a belt 21 which is adapted to pass over an idler pulley 21' for supplying rotary motion to a series of spindles 22 on the coning machine, idler pulleys 22' being provided to maintain belt 21 in contact with pulleys 22" on the spindle shafts.

Each spindle 22 is regularly provided with a lever 23 which controls the mechanism for starting or stopping the individual spindles. When the spindle has been stopped, or is idle, the lever is in vertical position (shown in dot-dash lines in Fig. 1). When the spindle is operating the lever 23 is in inclined position (shown in full lines in Fig. 1). In its vertical or idle position the lever 23 through a connecting link 24 attached to a lifter rod 25 causes plunger 26 on spindle switch 27 to be depressed, thus opening said switch. With lever 23 in inclined position and spindle 22 running connecting link 24 is in raised position, thus releasing the pressure on plunger 26 allows switch 27 to assume its normally closed position.

With all spindle switches 27 in closed contact position, the counter 28 in a housing fixed to a shelf 29 of the winding machine will receive an electrical impulse and will give a numerical registration for each individual spindle terminal 31 contacted by the rotating contacter 32, the electrical circuit being completed or closed through a common terminal 33 and contacts 34 and 35 (which are controlled by cam 18 with positive quick breaking snap-switch action) to the counter actuating coil 36 of the magnetic counter 28. Since the rotating contacter 32 rotates approximately once each minute there will be one numerical unit registered once each minute by counter 28 for each spindle switch 27 whose spindle 22 is running, as controlled by the position of the lever 23. Likewise there will be no units registered for idle spindles with contacts of spindle switches 27 open.

The operation of switch 34, 35 is as follows: The cam 18 has fourteen notches around its circumference, which notches are arranged in definite relation to rotating contacter 32 and terminal 31. The cam 18 and contacter 32 are rigidly connected. As cam 18 rotates each notch on its circumference raises element 35 of the switch so that it comes in contact with contact point 34 thereof and holds this contact for a predetermined time.

Cam 18 and contacter 32 are designed so that contacter 32 moves directly over terminal 31 before the notch on cam 18 actuates elements 34 and 35 in close position. Cam 18 continues its rotation. When the notch on the circumference of the cam moves under the apex point of element 35, it allows this element to drop, therefore making the break in contact instantaneous and greatly reducing the electrical arcing and the heat that is generated when arcing occurs.

If the switch 34, 35 were not used, the electrical arcing at terminal 31 and contacter 32 would be greatly increased, generating intense heat and consequently burning the contacts at elements 31 and 32. This succession of switches is designed to take up potential high voltage without becoming overheated and burning out the points of contact. Moreover, in case the points should burn out in this particular design, it would be points at 34 and 35 instead of at 31 and 32. The points at 34 and 35 are considerably cheaper to replace than the points at 31 and 32. Therefore, the present arrangement or design reduces arcing which coincides with the underwriters' code and adds considerably to the life and carefree service of the present device.

At any time, such as at a change of shift, etc. by the operation of resetting switch 37 (which may be a lock switch requiring a key to open) the counter coil 36 is cut out of the circuit and the resetting coil or solenoid 38 is energized. Energizing resetting solenoid 38 causes the plunger 39 to execute a downward stroke which is transmitted through adjustable connecting link 41 to a lever arm 42 pivoted at 43 in a bracket 44 fastened to a wall of the counter casing 45. Downward movement of the connecting link 41 and plunger 39 causes the raising of rack 46 which operates pinion 47, thus resetting the number wheels to zero by one revolution of said pinion 47. The pinion operates against the action of spring 48 through rack 46. With the release of switch 37 the counter coil 36 is again restored to the circuit and the solenoid 38 is deenergized so that spring 48 restores the resetting arrangement to their initial and normal position ready for resetting action. In order to prevent a too rapid movement of the resetting arrangements lever arm 42 is provided with a connecting link 49 which cooperates with an air cylinder 51 and plunger 52 in a dash-pot arrangement to slow down the resetting action and prevent undue shock and strain being imposed on the counter 28. Counter 28 is visible through an opening 53 in the casing and is magnified by a lense 54. The counter 28 may be arranged to register in any predetermined units and in any suitable manner.

It is to be understood that the foregoing detailed description is merely given by way of illustration and that many variations may be made therein without departing from the spirit of my invention.

Having described my invention, what I desire to secure by Letters Patent is:

1. In a registering device for automatically checking the operation of a winding machine wherein a plurality of spindles are driven by a common drive, means in association with each spindle for detecting the operative status of each spindle, means for registering the number of times said registering means are connected with said detecting means in association with an operating spindle, and means for connecting said registering means with each of said detecting means in turn at regular intervals, said connecting means being driven by the common drive of the spindles whereby each spindle is checked at uniform intervals in the course of its revolutions.

2. In a registering device for automatically checking the operation of a winding machine wherein a plurality of spindles are driven by a common drive, an electric circuit including a switch electrically connected to each spindle for detecting the operative status of each spindle, means for registering the number of times said registering means are connected with said detecting means in association with an operating spindle, and means for connecting said registering means with each of said detecting means in turn at regular intervals, said connecting means being driven by the common drive of the spindles whereby each spindle is checked at uniform intervals in the course of its revolutions.

3. In a registering device for automatically checking the operation of a winding machine wherein a plurality of spindles are driven by a common drive, an electric circuit including a switch electrically connected to each spindle for detecting the operative status of each spindle, means for registering the number of times said registering means are connected with said detecting means in association with an operating spindle, and a rotary switch for connecting said registering means with each of said detecting means in turn at regular intervals, said connecting means being driven by the common drive of the spindles whereby each spindle is checked at uniform intervals in the course of its revolutions.

4. In a registering device for automatically checking the operation of a winding machine wherein a plurality of spindles are driven by a common drive, an electric circuit including a switch electrically connected to each spindle for detecting the operative status of each spindle, means for registering the number of times said registering means are connected with said detecting means in association with an operating spindle, and a rotary switch for connecting said registering means with each of said detecting means in turn at regular intervals, said connecting means having a contact breaker in its circuit and being driven by the common drive of the spindles whereby each spindle is checked at uniform intervals in the course of its revolutions.

WILLIAM T. STEARN.